United States Patent [19]

Wiegardt

[11] Patent Number: 4,503,916

[45] Date of Patent: Mar. 12, 1985

[54] HYBRID HITCH CONTROL SYSTEM

[75] Inventor: Gordon K. Wiegardt, Cedar Falls, Iowa

[73] Assignee: Deere & Company, Moline, Ill.

[21] Appl. No.: 501,690

[22] Filed: Jun. 6, 1983

[51] Int. Cl.³ ............................................ A01B 63/112
[52] U.S. Cl. ............................................ 172/3; 172/9
[58] Field of Search .................... 172/2, 3, 7, 9, 10, 172/11, 12

[56] References Cited

U.S. PATENT DOCUMENTS 4,463,658  8/1984  Heiser et al. ..................... 172/7 X

FOREIGN PATENT DOCUMENTS 2009580  6/1979  United Kingdom ..................... 172/9
2093676  9/1982  United Kingdom ..................... 172/10

Primary Examiner—Richard T. Stouffer

[57] ABSTRACT

A conventional non-electrical draft/position responsive hitch control system is modified to respond to an electrical control signal derived from sensed engine droop and wheel slip.

15 Claims, 7 Drawing Figures

HYBRID HITCH CONTROL SYSTEM

BACKGROUND OF THE INVENTION

The present invention relates to a hitch control system for an agricultural vehicle.

Hitch control systems currently in use on agricultural tractors control the hitch in response to mechanically or hydraulically sensed draft force, mechanically sensed rockshaft position and operator-generated control signals. Typical of such systems are the mechanical draft control system shown in U.S. Pat. No. 3,455,397 and the hydraulic draft control system shown in U.S. Pat. No. 3,990,520. Such systems also can provide means for controlling the mixture ratio of signals representing draft force and hitch position so that the hitch is controlled as a function of a variable and selected mixture of both sensed draft force and sensed rockshaft position. For an example of such a selective system, see U.S. Pat. No. 2,921.638.

Also known in the prior art is a hitch control system (described in U.S. Pat. No. 3,374,842), which includes electrically sensed draft force (via a strain gauge), an electrical control circuit and a position-responsive valve control linkage. However, this system does not include conventional mechanical or hydraulic draft force sensing, nor does it disclose any means for combining electrically sensed wheel slip or engine speed with conventional non-electrical sensed draft force.

Other hitch control systems have been proposed to control a hitch or implement in response to sensed wheel slip and engine speed in addition to sensed draft force and rockshaft position. However, these systems have required electronic transducers to sense the draft force and the rockshaft position in place of the conventional hydraulic or mechanical position and draft sensing mechanisms currently in use, and therefore, cannot be retrofitted to conventional production hitch control systems. Accordingly, it would be desirable to provide a hybrid which control system wherein electrically sensed inputs, such as wheel slip and engine speed signals, are combined with the non-electrically sensed position and draft force inputs of current production hitch control systems.

SUMMARY OF THE INVENTION

An object of the present invention is to provide a hitch control system having conventional hydraulic or mechanical draft and position sensing with the additional capability of responding to changes in engine speed or wheel slip.

A further object of the present invention is to provide such a hitch control system in which the sensitivity to engine speed and wheel slip is compensated or adjusted according to the setting of an operator-controlled draft-/position mixture control.

These and other objects are achieved by the present invention which includes a hydraulic draft force sensor and a mechanical hitch position sensor. Additional electronic sensors sense engine droop and wheel slip and an electronic control unit generates an electronic control signal as a function thereof. An electrohydraulic valve modifies the draft force pressure as a function of the control signal. The modified pressure signal and the position signal are mixed and communicated to a conventional hitch raise and lower valve. A variable gain applied to the engine droop and wheel slip may be controlled as a function of the mixture of the modified pressure signal and of the position signal.

DETAILED DESCRIPTION

Figure 1:
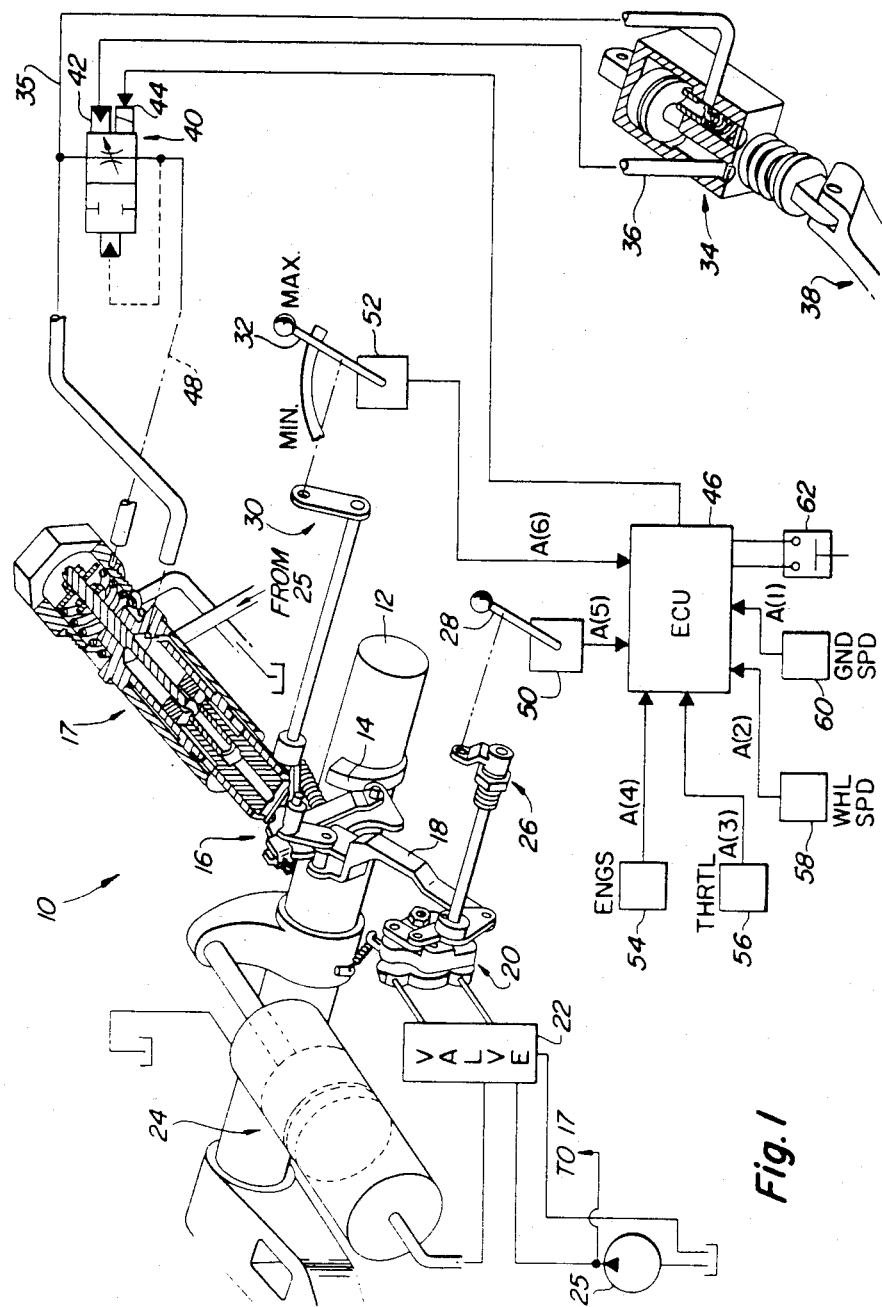
FIG. 1 is a schematic diagram of a hitch control system according to the present invention.
Figure 2A:
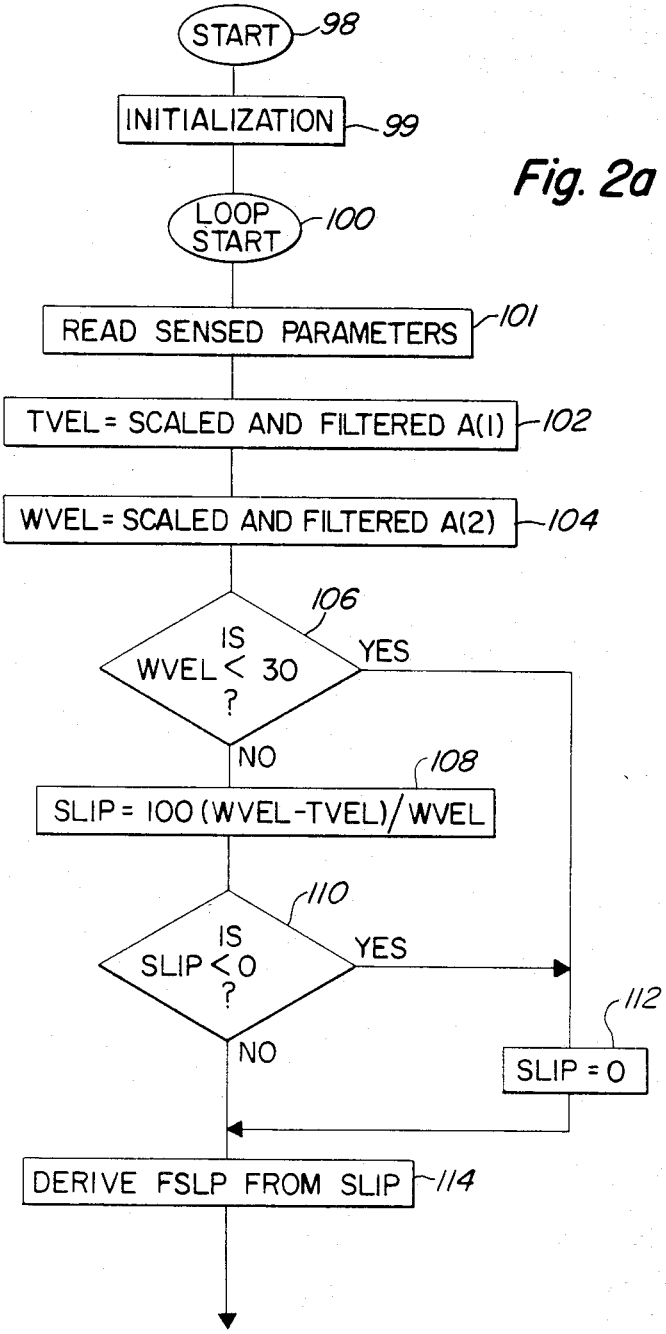
FIGS. 2a–2f are logic flow diagrams of an algorithm executed by the electronic control unit of FIG. 1.
Figure 2B:
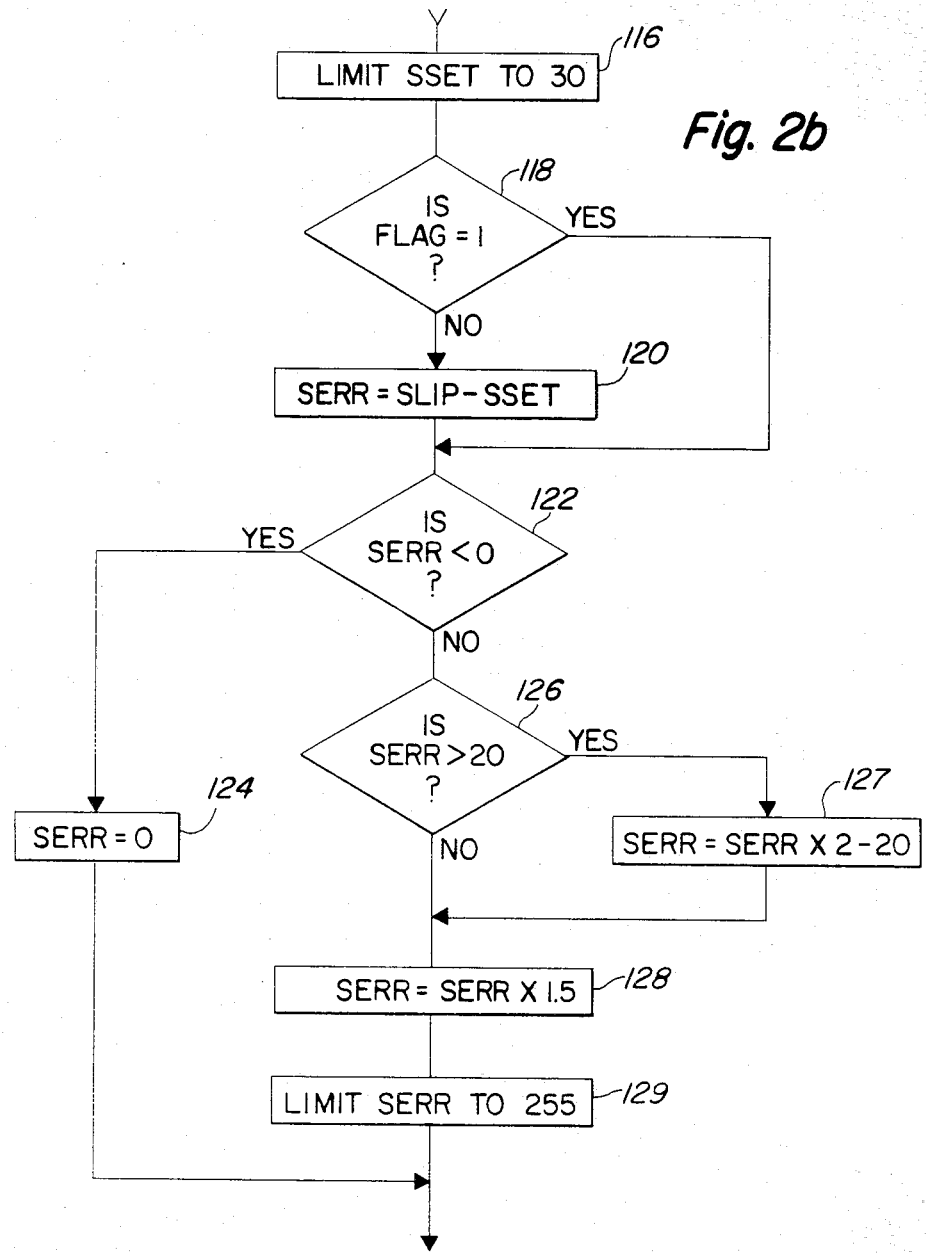
Figure 2C:
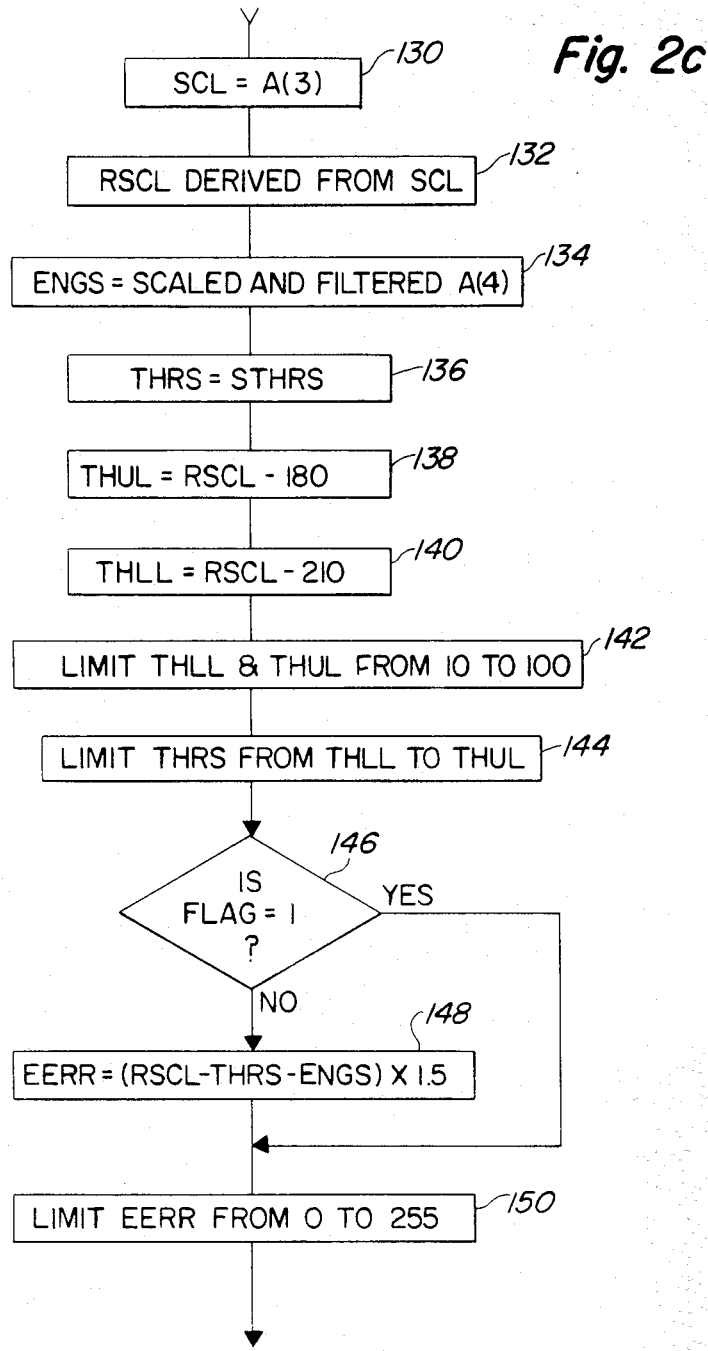
Figure 2D:
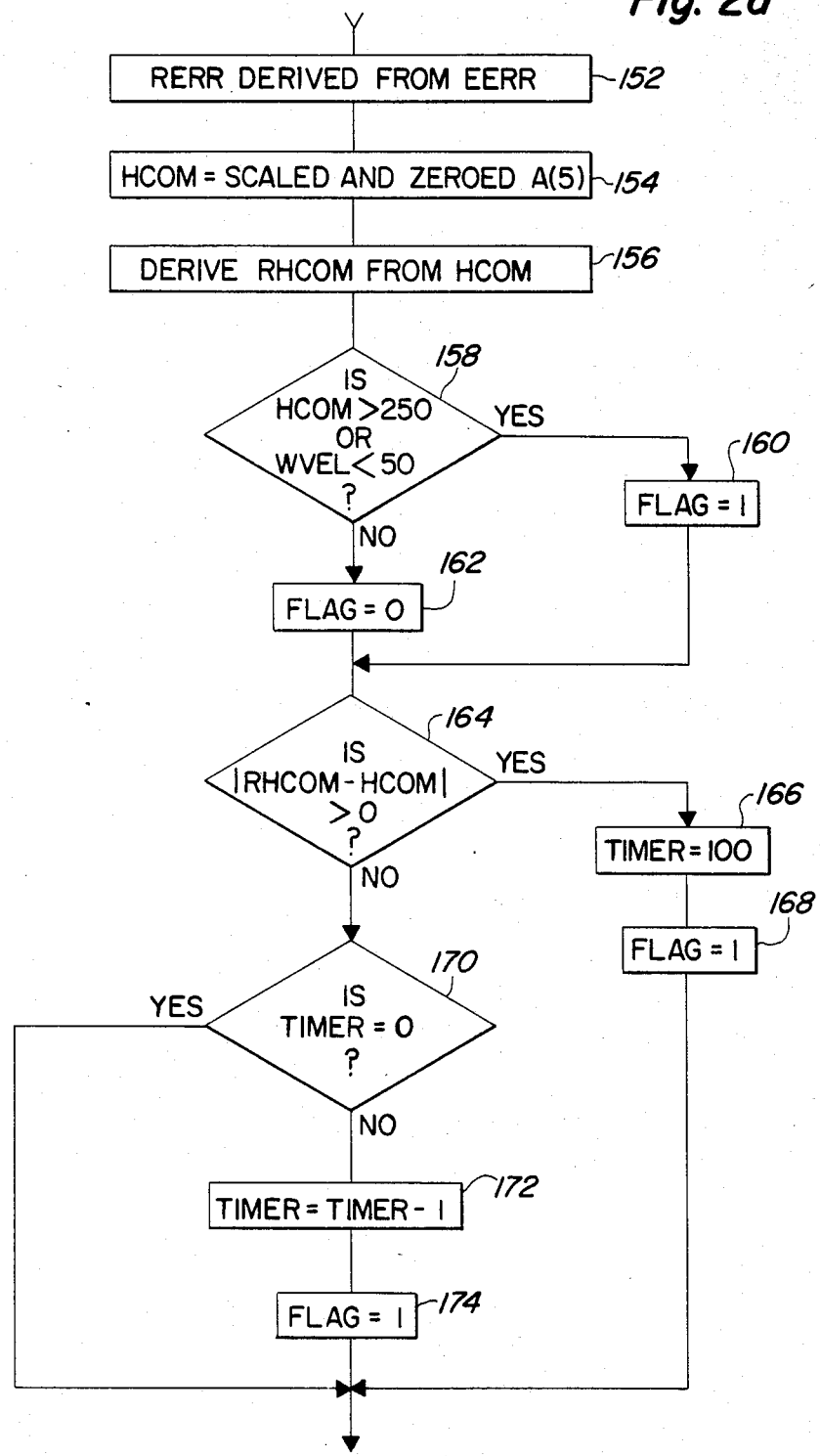
Figure 2E:
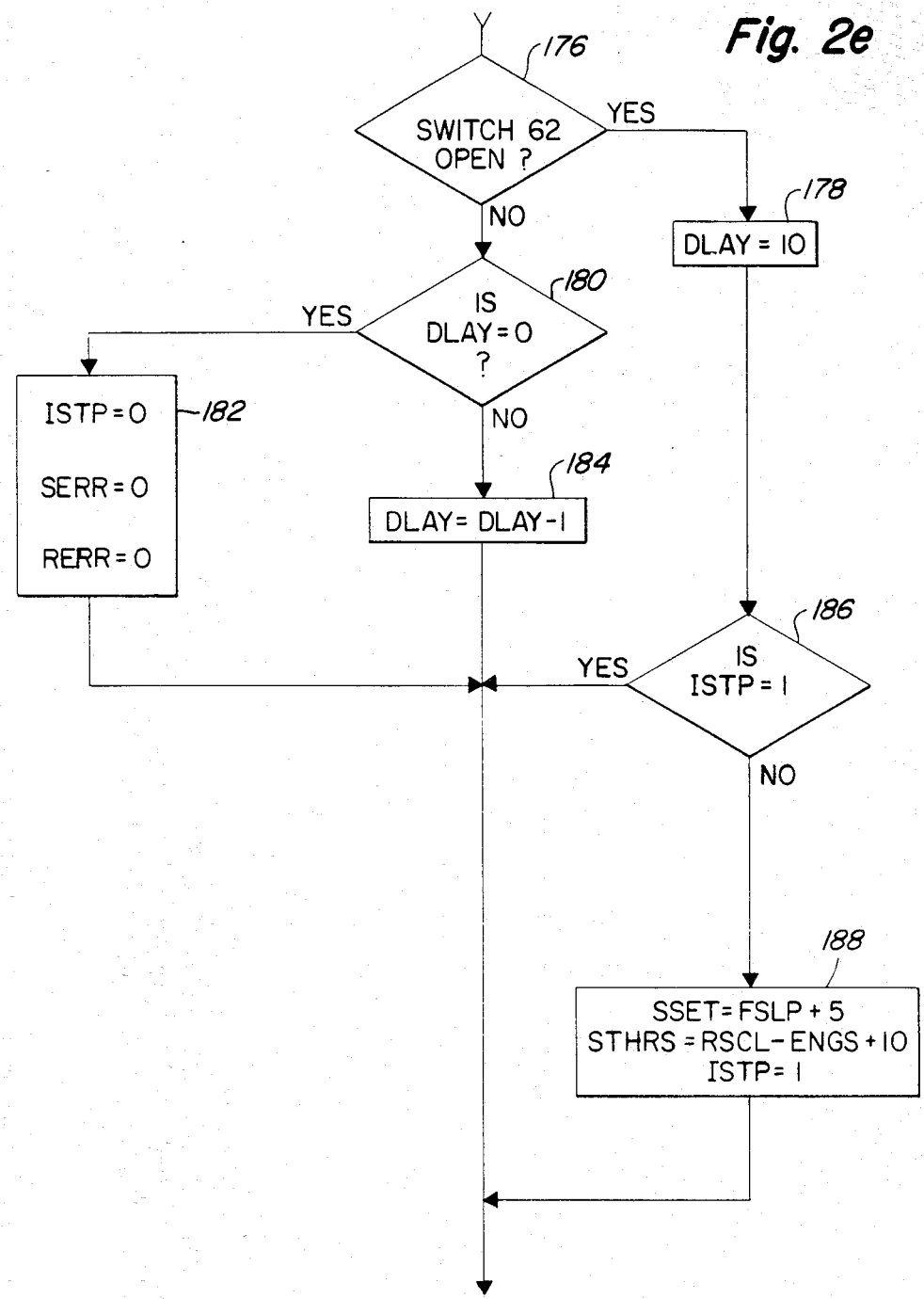
Figure 2F:
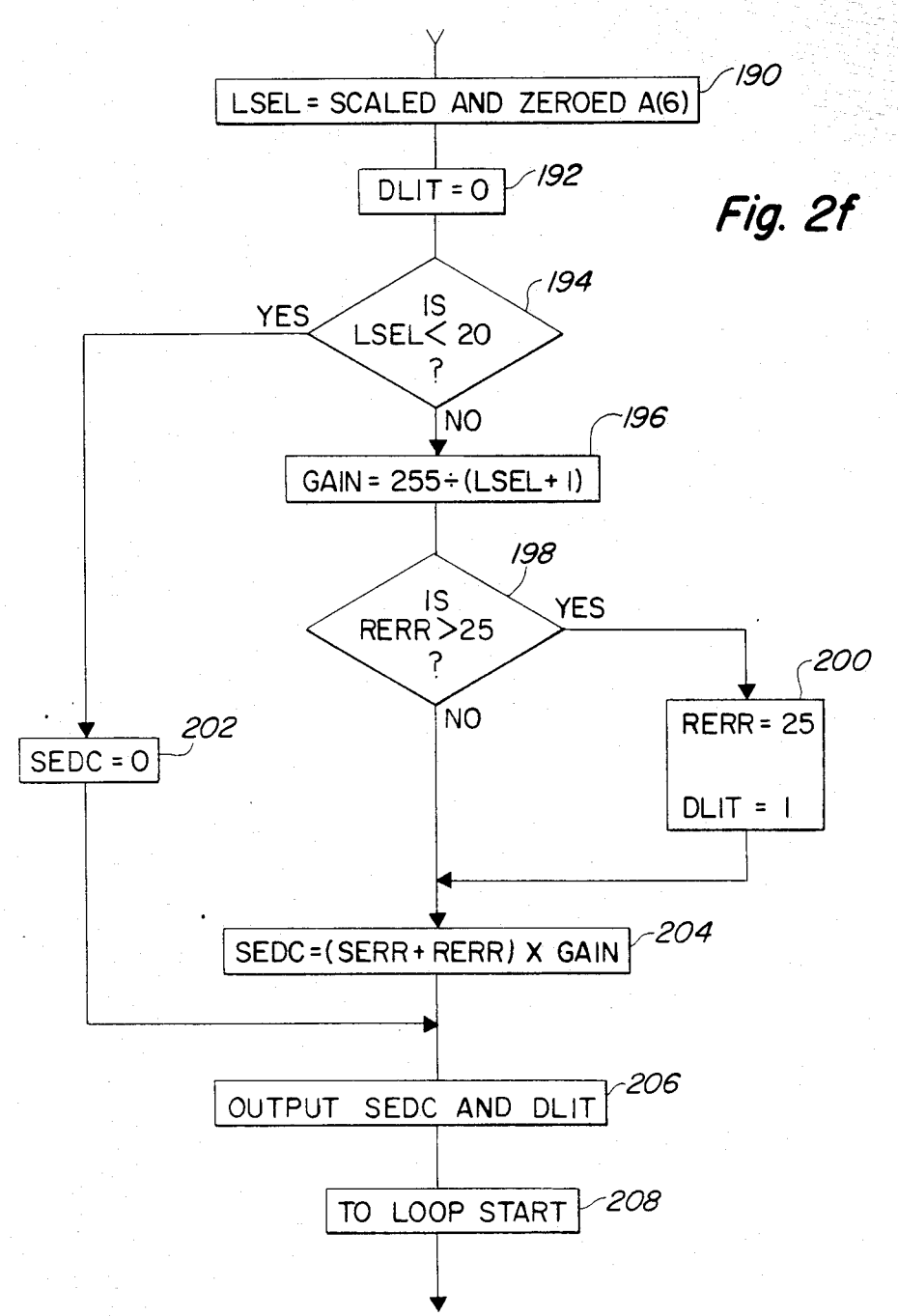

FIG. 1 shows the present invention in the environment of a hitch control system with hydraulic draft force sensing. The hitch control system 10 includes a conventional rockshaft 12 with a position-representing ramp 14. A conventional follower link 16 has one end engaging the ramp 14 and another end for engaging the piston of a known load control valve assembly 17, such as described in U.S. Pat. No. 3,990,520.

A transmitting or valve operating link 18 is coupled between the link 16 and a conventional valve operating cam mechanism 20. The mechanism 20 operates a known raise and lower valve 22 which, in turn, causes a rockshaft cylinder 24 to extend and retract to raise and lower the hitch (not shown) via conventional lift arms and lift links (not shown). Load control valve 17 and valve 22 both receive pressurized fluid from pump 25.

The mechanism 20 includes conventional means 26 for coupling to a known hitch control lever 28. A load control selector means 30 moves the link 18 relative to the link 16 in response to the movement of a known load control selector means 32.

A known hydraulic draft force sensor 34 receives pressurized hydraulic fluid via line 35 and generates a variable hydraulic pressure in line 36 which is a function of draft forces applied to a draft link 38.

The present invention includes a pressure-compensated, pilot-operated pressure control valve 40 with an inlet communicated with pressure line 35 and an outlet communicated with a control chamber of load control valve 17 via line 41. Valve 40 includes a pair of pilots 42 and 44 which operate in parallel. Pilot 42 is pressure-operated and receives the draft force related pressure from draft sensor 34 via line 36. Pilot 44 is electrically operated and receives an electrical control signal from electronic control unit (ECU) 46. Thus, the pressure in line 41 is a function of the draft force and the control signal from ECU 46. Load control valve 17 then operates in a known manner on link 16 in response to fluid pressure changes in line 41.

It follows that the movement of valve operating link 18 is a function of rockshaft position (via ramp 14), and of draft force and the electronic control signal (via valve 40).

The ECU 46 receives signals from a hitch control lever position transducer 50 and a load control selector position transducer 52. ECU 46 also receives signals from an engine speed sensor 54, a throttle position transducer 56, a driven wheel speed sensor 58 and a ground speed sensor 60. A normally open, momentary contact or "set point" switch 62 is also coupled to the ECU.

The ECU 46 may consist of a commercially available microprocessor and appropriate input and output hardware, such a described in U.S. Pat. No. 4,013,875. The particular hardware used in control unit 40 forms no part of the present invention and is deemed to be evident to one with ordinary skill in the hardware construction of microprocessor-based control systems.

The ECU 46 generates control signals for communication to the valve 40 as a function of its inputs according to a control algorithm such as that which will now be described with reference to the flow chart shown in FIGS. 2a–2f.

The algorithm performed by the ECU 46 starts at step 98 and then at step 99, various initial conditions are established for values designated by the following acronyms (to be defined later):

ENGS=0
FLAG=0
FLSP=0
HCOM=0
ISTP=0
RERR=0
RHCOM=0
RSCL=0
SSET=30
STHRS=45
TIMER=0
TVEL=0
WVEL=0

The main algorithm loop begins at step 100, which is followed by step 101 where values from various parameter sensors 50–60 and from switch 52 are read and transferred into storage registers (not shown) in the ECU 46.

Then, in step 102, a filtered tractor velocity (ground speed) value, TVEL, is calculated from the statement $TVEL=(3\times TVEL+A(1))/4$, where the TVEL value on the right side is the initial value set in step 99 or the value established in step 102 of a previous cycle of the routine, where A(1) is the sensed ground speed value from sensor 60. Thus, the TVEL value is a weighted average of a previous TVEL value and the current sensed ground speed value.

Next, at step 104, a scaled and filtered rear wheel velocity value WVEL is derived from the current rear wheel speed input value A(2) from sensor 58 by the statement $WVEL=(3\times WVEL+A(2))/4$. At step 106, the rear wheel velocity, WVEL, is compared to a reference value of 30, which is a digital number representing a speed of 0.3 meters per second. If WVEL is less than 0.3 meters per second, then the program proceeds to steps 112 and 114. If WVEL is not less than 0.3 meters per second, then the routine goes to step 108 where a SLIP value is calculated from the statement $SLIP=100(WVEL-TVEL)/WVEL$. Thus, the SLIP value varies between zero and 100, as a percentage figure. Following step 108, the SLIP value is compared to 0 in step 110. If the SLIP value is less than 0, then SLIP is set equal to 0 at step 112. If the SLIP is not less than 0, then the routine proceeds to step 114. In this manner, the value of SLIP will be greater than or equal to zero for the subsequent calculations in the routine.

At step 114, a filtered slip value, FSLP, is derived from the statement $FSLP=(127\times FSLP+SLIP)/128$. Thus, the updated filtered FSLP value is a weighted average of the previous FSLP value (initially 0 or as set in step 114 of the previous cycle), and the most recently determined SLIP value from step 108 or 112. The weighting factors described here prevent rapid fluctuations in the FSLP value in response to short duration fluctuations in the SLIP value.

Next, at step 116, a maximum value, representing, for example, 30% wheel slippage, is established as an upper limit for the slip set value, or reference slip value, SSET, initially 30 or set by step 188 of a previous cycle of the routine. In this manner, the SSET value is limited to a maximum value representing 30%, but it can be less.

Next, steps 118 and 120 operate to set a slip error value, SERR, equal to SLIP minus SSET, unless a FLAG value is set equal to 1 in response to movement of the hitch control lever 28 (as in later steps 160, 168 or 174).

Next, at steps 122–129, a dual slip error gain is established, depending upon the magnitude of the slip error value, SERR, as determined in step 120. For example, if, in step 120, SERR is less than zero, then the routine proceeds to step 124, where SERR is set equal to zero, and then to step 130. However, if SERR is not less than zero, then SERR is compared to a value such as 20 in step 126. If SERR is greater than 20, then a new SERR value is obtained from steps 127 and 128 so that the new SERR value is equal to $1.5\times((\text{old SERR value}\times 2)-20)$. However, if SERR is not greater than 20 in step 126, then the routine proceeds directly to step 128 where the gain factor 1.5 is applied to the SERR value. In this manner, the control system is able to respond more rapidly to larger magnitudes of wheel slippage represented by the SERR value. The values of the gain factors in steps 127 and 128 may be experimentally determined to achieve the desired sensitivity of the system to wheel slippage. The particular values may vary, depending upon the particular vehicle and implement involved. In step 129, an upper limit 255 is established for the SERR value to prevent overflow of the 8-digit register containing that value.

At step 130, the speed control lever position value, SCL, is derived from the value A(3) from the speed control lever position transducer 56 so that, for example, 1 count of SCL represents 10 rpm of engine speed. Next, in a portion of the routine represented by step 132, a rate limited speed control lever value, RSCL, is derived from the SCL value established in step 130. Specifically, the RSCL value (initially set at 0 in step 99) is changed during each cycle of the routine by an amount which is proportional to changes in the speed control lever position, as represented by changes in the values A(3) and SCL. If the speed control lever position is changing in the direction corresponding to increasing engine speed then the incremental increase in the RSCL value during each cycle of the routine is limited so that the RSCL value can increase no faster than a rate corresponding to a rate of increased engine speed of, for example, 700 rpm per second. The RSCL value is not rate-limited when the speed control lever is moved in the direction representing a lowering of the engine speed. As will be seen from later steps in the routine, this rate limit on the RSCL value will, in the event of a rapid advance of the speed control lever, limit the engine speed error value, EERR, by limiting the updated rate limited speed control value RSCL, and eventually prevent undesirable raising of the hitch in response to a rapid advance of the engine speed control lever.

At step 134, the updated engine speed value, ENGS, is calculated from the statement $ENGS=(3\times ENGS+A(8))/4$, where A(4) is the value from the engine speed sensor 54, and where the ENGS value on the right is initially zero from step 99 or is set at step 134 of a previous cycle of the routine. The ENGS value is scaled so that 1 count represents 10 rpm.

Next, at step 136, an engine speed threshold value, THRS, is assigned the value of the stored engine speed threshold value, STHRS, which is initially 45, in step 99, corresponding to a deadband of 450 rpm, or is set in step 188 of a previous cycle of the routine. Then, in steps 138 and 140, lower limit and upper limit threshold values, THUL and THLL, respectively, are derived from the rate limited speed control lever value, RSCL. Next, in step 142, minimum and maximum values 1 and 100, respectively, are established for both the THLL and THUL values. Finally, in step 144, the THLL and THUL values are established as minimum and maximum values, respectively, for the engine speed threshold value, THRS, for use in calculating the engine speed error value EERR in later step 148.

Then, step 146 directs the algorithm to step 150 if the FLAG value is equal to 1, otherwise, the algorithm proceeds to step 148.

In step 148, an engine error (or droop) value, EERR, is calculated from the statement $EERR = (RSCL - THRS - ENGS) \times 1.5$, where RSCL is the rate limited speed control lever position value from step 132, THRS is the engine speed threshold value from step 144 and 1.5 is an engine error gain or sensitivity factor chosen so that the system has a desired sensitivity to variations in the engine speed. The terms $RSCL - THRS$ in step 148 can be viewed as an engine speed set point below which the engine speed value, ENGS, must fall before a positive EERR value will be generated. (Negative EERR values are ignored due to later step 150.) This set point value will always be smaller than the RSCL value by the amount of the THRS value, which, due to steps 136-144, can vary between 10 and 100 representing rpms of 100 and 1000, respectively. By maintaining this set point always a certain amount less than the speed control lever position represented by the RSCL value, the implement is prevented from being continuously raised and lowered in response to the normal continuous and minor fluctuations in the engine speed of the tractor. The minimum threshold value established in steps 136-144 prevents too small a THRS value from being used in step 148 if the load command control 50 is adjusted when the speed control lever 56 is at reduced engine speed settings. The maximum threshold value established in steps 138-144 prevents too large a THRS value from being used in step 148 when the speed control lever 56 is moved to reduce engine speed settings after a stored threshold value, STHRS, has been set in step 188 when the speed control lever 56 is at large engine speed settings. By operation of step 146, recalculation of the EERR value in step 148 is prevented if the hitch control lever is moved and FLAG=1.

Next, in a portion of the routine represented by step 150, lower and upper limits, 0 and 255, respectively, are established for the range of possible EERR values. As mentioned previously, step 150 prevents a negative EERR value from influencing the hitch and/or implement and prevents any overflow in the eight bit register containing the EERR value.

Next, in a portion of the routine represented by step 152, a rate limited engine speed error value, RERR, is derived from the engine speed error value, EERR. In short, when the EERR value is increasing, then the RERR value is incrementally increased each cycle of the routine by a constant amount which can be no greater than an amount corresponding to a rate of change of, for example, 420 rpm per second. Alternatively, if the EERR value is decreasing, then the RERR value is incrementally decreased each cycle of the routine by an amount corresponding to a rate of change of, for example, 160 rpm per second. Thus, the RERR value will increase or decrease in a linear fashion as a function of time. The rate limited engine speed error value RERR is then used later in the routine in the determination of the load or combined error value, LERR. In this manner, the sensitivity of the system to changes in engine speed, that is, the rate at which the implement is raised in response to a deteriorating or lugged-down engine speed and the rate at which the implement is lowered in response to a recovering engine speed, is limited to achieve a more stable control system by preventing over-shoot and hunting. The limits are different under the deteriorating and recovering engine speed situations because it has been found to be desirable to permit a faster implement raising speed to prevent engine stalling, while the slower implement lower speed is desirable for system stability.

In step 154, a scaled and zeroed hitch command value, HCOM, is derived from an A(5) value from sensor 50 representing the position of the hitch command lever 28. The HCOM value is derived so that HCOM values from 0 to 255 represent the full range of positions of the lever 28. Then, in a portion of the routine represented by step 156, a rate-limited hitch command value, RHCOM, is derived from the HCOM value. In short, the RHCOM value is incremented or decremented each cycle of the routine in response to an increasing or a decreasing, respectively, HCOM value. The increment and decrement are chosen so that for a maximum possible step change in the HCOM value, the RHCOM value will attain the new HCOM value on the order of approximately 6 to 8 seconds.

Next, in step 156, the HCOM value is compared to 250 and the WVEL value is compared to 50. If the HCOM value is greater than 250, or if the WVEL is less than 5, then the routine proceeds to step 160 where FLAG is set equal to 1. Otherwise, FLAG is set equal to 0 at step 162. Together, with step 146, this prevents recalculation of the EERR value when the hitch control lever 28 is at an end of its position range and when there is only a small amount of wheel slippage.

In step 164, the RHCOM and HCOM values are examined to determine if the operator is changing the setting of the hitch command lever 28 by comparing to zero the absolute magnitude of the difference between the rate-limited hitch command value, RHCOM and the hitch command value, HCOM. If this difference is non-zero, then from step 164, the routine proceeds to steps 166 and 168. In step 166, a countdown counter or timer value, TIMER, is initialized to 100 which represents a certain set point delay time period. In step 168, the FLAG value is set equal to 1 so that step 146 will prevent recalculation of EERR in step 148. After step 168, the routine proceeds to step 176.

However, if (RHCOM−HCOM) equals zero in step 164, then the routine proceeds to step 170. Step 170 determines whether the counter set in step 166 has been counted down to zero. If the counter has not been counted down to zero, then the routine proceeds to steps 172 and 174, where the counter is decreased by 1 count and where FLAG is set equal to 1 after which the routine proceeds to step 176. If the counter has counted down to zero in step 170, then the routine proceeds directly to step 176.

Next, step 176 determines whether the switch 62 is open or closed. If switch 62 is open, the algorithm proceeds to step 178 where a counter value, DLAY, is set equal to 0, after which the algorithm proceeds to step 186. Step 186 directs the algorithm to step 188 if an ISTP flag value is equal to 1. Otherwise, the algorithm is directed to step 190. Step 188 sets the SSET value equal to FSLP+5, sets the STHRS value equal to RSCL−ENGS+10, and sets the ISTP flag equal to 1.

Returning to step 176, if the switch 62 is closed, then the algorithm proceeds to step 180. Step 180 directs the algorithm to step 182 if the DLAY counter value is equal to 0, otherwise, the algorithm proceeds to step 184. In step 182, the ISTP flag and the SERR and RERR values are all set equal to 0, after which the algorithm proceeds to step 190. In step 184, the DLAY counter value is decreased by 1, after which the algorithm proceeds to step 190.

In this manner, steps 170–188 operate so that after switch 62 has been closed for 100 msec., the ISTP flag, the slip error value, SERR and the rate limited engine speed error value, RERR, are all set equal to 0 in step 182. The ISTP, SERR and RERR values will remain equal to 0 as long as switch 62 remains closed.

Then, when switch 62 is released and opened (after being closed for at least 100 msec.) the operating set point values SSET and STHRS are reset in step 188. Thus, upon opening of switch 62, the set point values are recalculated in step 188 for use in other portions of the algorithm. For example, the slip set value, SSET, is set equal to the sum of the filtered slip value, FSLP, (from step 114)+5. In this manner, wheel slip, which is less than 5% above the average slip value, FSLP, will not cause the implement to raise. The stored engine speed threshold value, STHRS, is determined by the statement $STHRS = RSCL - ELIM + 10$, 10 representing 100 rpm. Finally, in step 188, the flag value, ISTP, is set equal to 1 so that step 186 will prevent recalculation of the various set point values unless the ISTP value is reset to 0 at step 182 in a subsequent cycle of the routine. The recalculated set point values are maintained until they are again recalculated in response to another operation of switch 62.

Next, in step 190, a scaled and zeroed load selector value, LSEL, is derived from the A(6) value which is generated by potentiometer 62 to represent the position of the load selector lever or means 32. This is done so that the LSEL value will range from a value of 100 (representing maximum draft force sensitivity) to a value of 0 (representing maximum position sensitivity).

In step 192, a downshift indicator flag, DLIT, is set equal to 0.

Then, step 194 determines whether LSEL is less than 20. If LSEL is less than 20, the algorithm proceeds to step 202 where the slip and droop control signal, SEDC is set equal to 0. Otherwise, the algorithm proceeds to step 196 where a slip and droop gain value, GAIN, is derived from the LSEL value. Thus, the electronic slip and droop control signal, SEDC is set to 0 in step 202 to prevent engine speed and slip from interfering with the position control of the hitch when the load selector lever 32 is set for primarily position control.

Then, if the rate limited engine speed error, RERR, is greater than 25, step 198 directs the algorithm to step 200 where RERR is set equal to 25 and DLIT is set equal to 1. Thus, when engine droop is greater than 250 rpm, the RERR value is limited and the DLIT flag is set equal to 1 so that a warning signal can be generated to inform the operator that a limit has been reached and that if further reduction of engine droop is desired, it must be achieved through downshifting the tractor transmission (not shown) or by manually raising the hitch.

If RERR is not greater than 25, then the algorithm proceeds to step 204 where the slip and droop control signal is calculated from the SERR, RERR and GAIN values.

Next, step 206 causes the SEDC value to be communicated from the ECU 46 to solenoid 44 of valve 40, and causes the DLIT value to be communicated to an appropriate warning device (not shown), such as an indicator light.

Finally, the algorithm is returned to step 100 by step 208.

It should be noted that, due to steps 196 and 204, the SEDC value is influenced by the setting of load select lever 32. Thus, the sensitivity of link 18 to slip and engine droop (which is dependent upon the setting of the load select lever 32) is compensated by adjusting the gain (applied to slip and droop in step 204) as a function the load select lever setting. In this manner, the sensitivity of link 18 to slip and droop may be held constant or varied in a certain manner over a range of settings of the load select lever 32, depending upon the functional relationship of GAIN and LSEL and of SEDC and GAIN.

Thus, the interface valve, 40, shown in FIG. 1 can either reproduce the pressure from load sensing cylinder 34 or add to it by responding to the electrical SEDC signal from the ECU. If the current to the valve's proportional solenoid 44 is zero, the load sensing pressure is exactly duplicated. If the current is increased, the load sensing pressure will be increased in proportion to the current up to a predetermined limit. As the current is reduced to zero, this load sensing bias pressure will also reduce to zero. As a result, the hitch can be raised by increasing the load on the draft links or by increasing the current to the interface valve.

To operate the hitch with the electronic slip and engine droop enhancement control, the load selector lever 32 must be placed in a position other than "min". The hitch control lever 28 is moved forward to engage the implement with the ground. After the hitch control lever 28 is readjusted to obtain the desired operating performance, the set switch 62 is depressed and released. Releasing the switch commands the ECU 46 to determine (in step 188) the operating set points for wheel slip and engine droop and activates the solenoid control circuit if the tractor was just started. From this point on, an increased wheel slip or a decreased engine speed will cause the current to the solenoid 44 to increase which will cause the hitch to raise. Thus, the draft controlled hitch operation is enhanced by signals derived from wheel slip or engine droop.

A signal from the load selector lever transducer 52 is used to modify the wheel slip error gain and engine droop gain to maintain a consistent hitch reaction to these signals as the load selector lever is adjusted. When the lever is set to MIN, the ECU output signal is inhibited by operation of steps 194 and 202.

To prevent an interaction between the ECU output and the hitch control lever 28, the ECU output current is held constant (by operation of steps 164–174 and 196) whenever the hitch control lever 28 is being moved and for a short interval of time after it has been adjusted. It is also held constant when the lever is in the transparent mode by operation of steps 158, 160 and 146.

New operating set points can be established at any time by depressing and releasing the set control switch 62. If the engine error becomes larger than 25 counts, a dash or panel light will be lit, indicating that the hitch controls should be readjusted. There is no limit on slip error other than the practical limits of the load sensing pressure.

The conversion of the above-described flow chart into a standard language for implementing the algorithm described by the flow chart in a digital data processor, such as a microprocessor, will be evident to those with ordinary skill in the art.

While the invention has been described in conjunction with a specific embodiment, it is to be understood that many alternatives, modifications, and variations will be apparent to those skilled in the art in light of the aforegoing description. For example, this invention could be adapted for use with a conventional draft and position-response hitch control system with mechanical draft sensing, such as described in U.S. Pat. No. 3,757,868. In this case, a hydraulic actuator would be interposed in the force transmitting link, and the electrohydraulic valve would be used to vary the length of the actuator as a function of the signal from the ECU. Accordingly, this invention is intended to embrace all such alternatives, modifications, and variations which fall within the spirit and scope of the appended claims.

I claim:

1. In an engine-driven vehicle hitch control system having a draft sensor for generating a non-electrical draft signal representing draft force applied to the hitch, a position sensor for generating a non-electrical position signal representing a position of the hitch, actuating means for raising and lowering the hitch as a function of non-electrical signals communicated thereto, and means for communicating the non-electrical signals to the actuating means, the improvement comprising:
parameter sensing means for sensing an operating parameter of the vehicle other than draft force and hitch position;
generating means for generating an electrical control signal as a function of the operating parameter; and
modifying means coupled between the communicating means and at least one of the sensors for modifying at least one of the non-electrical draft and position signals in response to changes in the electrical control signal, the communicating means communicating the modified signal to the actuating means so that the hitch is raised and lowered in response to changes in the sensed parameter, the sensed draft force and the sensed hitch position.

2. The hitch control system of claim 1, wherein:
the draft sensor comprises a hydraulic unit for generating a first pressure signal related to the draft force applied to the hitch; and
the modifying means comprises valve means for generating a second pressure signal which varies as a function of the first pressure signal and of the electrical control signal, the communicating means communicating the second pressure signal and the position signal to the actuating means.

3. The hitch control system of claim 2, wherein:
the modifying means comprises a pilot-operated valve having a first pressure-operated pilot communicated with the first pressure signal and a second electrically operated pilot communicated with the electrical control signal.

4. The hitch control system of claim 2, wherein the modifying means comprises:
a pressure control valve having a pair of pilots operating in parallel, one of the pilots comprising a pressure-operated pilot communicated with the first pressure signal, the other pilot comprising an electrically-operated pilot communicated with the electrical control signal.

5. The control system of claim 1, wherein the parameter sensing means comprises:
means for sensing slippage of driven wheels of the vehicle.

6. The control system of claim 1, wherein the parameter sensing means comprises:
means for sensing vehicle engine speed.

7. The control system of claim 1, wherein the parameter sensing means comprises:
means for sensing slippage of driven wheels of the vehicle; and
means for sensing vehicle engine speed.

8. The hitch control system of claim 1, further comprising:
selector means for controlling a mixture ratio for the non-electrical signals communicated to the actuating means, the generating means including means for multiplying the parameter signal by a variable gain factor to produce the electrical control signal, and means responsive to the selector means for varying the variable gain factor in response to changes in the mixture ratio.

9. In a vehicle control system having a draft sensor for generating a draft control signal representing draft force applied to the hitch, a position sensor for generating a position control signal representing a position of the hitch, actuating means for raising and lowering the hitch as a function of control signals applied thereto, means for communicating the control signals to the actuating means, and selector means for controlling a mixture ratio of the control signals communicated to the actuating means, the improvement comprising:
parameter sensing means for sensing an operating parameter of the vehicle other than draft force and hitch position;
means for generating a parameter control signal as a function of the operating parameter multiplied by a variable gain factor;
means responsive to the selector means for varying the variable gain factor in response to changes in the mixture ratio; and
modifying means coupled between the communicating means and at least one of the sensors for modifying the corresponding control signal in response to changes in the parameter control signal, the communicating means communicating the modified control signal to the actuating means so that the hitch is raised and lowered in response to changes in the sensed parameter, sensed draft force and sensed hitch position.

10. The hitch control system of claim 9, wherein:
the draft sensor comprises a hydraulic unit for generating a first pressure signal related to the draft force applied to the hitch; and
the modifying means comprises valve means for generating a second pressure signal which varies as a function of the first pressure signal and of the parameter control signal, the communicating means communicating the second pressure signal and the position signal to the actuating means.

11. The hitch control system of claim 10, wherein:
the modified means comprises a pilot-operated valve having a first pressure-operated pilot communicated with the first pressure signal and a second electrically operated pilot communicated with the parameter control signal.

12. The hitch control system of claim 10, wherein the modifying means comprises:
a pressure control valve having a pair of pilots operating in parallel, one of the pilots comprising a pressure-operated pilot communicated with the first pressure signal, the other pilot comprising an electrically operated pilot communicated with the parameter control signal.

13. The hitch control system of claim 9, wherein the parameter sensing means comprises:
means for sensing slippage of driven wheels of the vehicle.

14. The hitch control system of claim 9, wherein the parameter sensing means comprises:
means for sensing vehicle engine speed.

15. The hitch control system of claim 9 wherein the parameter sensing means comprises:
means for sensing slippage of driven wheels of the vehicle; and
means for sensing vehicle engine speed.

* * * * *